(12) United States Patent
Lo

(10) Patent No.: US 7,872,378 B2
(45) Date of Patent: Jan. 18, 2011

(54) POWER MANAGEMENT SYSTEM

(76) Inventor: Chung-Peng Lo, 3F., No. 2, Lane 91, Sec. 5, Sinyi Rd., Sinyi District, Taipei City 110 (TW)

( * ) Notice: Subject to any disclaimer, the term of this patent is extended or adjusted under 35 U.S.C. 154(b) by 54 days.

(21) Appl. No.: 12/323,981

(22) Filed: Nov. 26, 2008

(65) Prior Publication Data
US 2010/0007220 A1 Jan. 14, 2010

(30) Foreign Application Priority Data
Jul. 9, 2008 (TW) ............................... 97212133 U

(51) Int. Cl.
*H02J 1/00* (2006.01)
*H01H 77/00* (2006.01)
(52) U.S. Cl. ........................... 307/116; 307/1; 307/125; 307/151
(58) Field of Classification Search ................. 307/1, 307/116, 125, 151
See application file for complete search history.

(56) References Cited
U.S. PATENT DOCUMENTS

| | | | | |
|---|---|---|---|---|
| 6,140,911 A | * | 10/2000 | Fisher et al. ................ | 375/258 |
| 6,348,874 B1 | * | 2/2002 | Cole et al. ............. | 340/825.01 |
| 6,640,308 B1 | * | 10/2003 | Keyghobad et al. ......... | 713/300 |
| 7,248,097 B2 | * | 7/2007 | Montgomery ............... | 327/538 |
| 7,373,528 B2 | * | 5/2008 | Schindler .................... | 713/300 |
| 7,400,062 B2 | * | 7/2008 | Pincu et al. .................. | 307/29 |
| 7,417,443 B2 | * | 8/2008 | Admon et al. .............. | 324/713 |
| 7,599,485 B2 | * | 10/2009 | Karam ....................... | 379/413 |
| 2006/0164773 A1 | * | 7/2006 | Stanford et al. ............ | 361/93.1 |
| 2007/0041577 A1 | * | 2/2007 | Ghoshal et al. ............. | 379/413 |
| 2007/0189495 A1 | * | 8/2007 | Crawley et al. ............. | 379/323 |
| 2008/0290729 A1 | * | 11/2008 | Schoenberg et al. ........... | 307/3 |

\* cited by examiner

*Primary Examiner*—Jared J Fureman
*Assistant Examiner*—Adi Amrany
(74) *Attorney, Agent, or Firm*—Rosenberg, Klein & Lee

(57) ABSTRACT

A power management system for coupling to a worksite power-supply network and a PoE (Power over Ethernet) network, includes a power receiving terminal for receiving an input operating voltage with 24 volt DC from the worksite power-supply network, a voltage converter for converting the input operating voltage into an output operating voltage, and a power output terminal for transmitting the output operating voltage to a powered device coupled to the PoE network.

4 Claims, 3 Drawing Sheets

POWER MANAGEMENT SYSTEM

This application claims the benefit of the Taiwan Patent Application Serial NO. 097212133, filed on Jul. 9, 2008, the subject matter of which is incorporated herein by reference.

BACKGROUND OF THE INVENTION

1. Field of the Invention

The present invention relates to a power management system, more particularly to a power source management system for managing and powering the powered devices in the PoE (Power over Ethernet) network.

2. Description of the Related Art

Power over Ethernet uses twisted-pair cable to transfer electrical power to several powered devices within an Ethernet network. With this PoE technology, electrical power is supplied to the powered devices, such as IP telephones, wireless LAN access points, network cameras, routers and embedded computers, which is inconvenient to be equipped with a cabled power supply system. In addition, when PoE technology is implemented, the cable structure of the Ethernet does not need to be altered.

The PoE technology uses the IEEE 802.3af/802.3at standard and protocol for supplying power and data to Ethernet. The IEEE standard does not decrease data transmission ability and transmission distance via the network. After assuring the attached device is PoE-compatible, electrical power is supplied to the attached device. When the attached device is non PoE-compatible, electrical power is cut out. Due to these characteristics, the user can combine the conventional power supply device with the PoE-compatible powered device at any desired time and places.

The electrical power supplied by the presently available PoE technology is 48 volt DC, i.e., an electrical power supply mode in high voltage, but with low current. The current is generally below 0.8 amp and the ampere above will be dangerous to the power-supply cable. Currently, an automatic power-supply network for supplying electrical power to factories or worksites generally use 24 volt DC, this current is not suitable to be supplied directly to powered devices in an Ethernet network. Therefore, an improvement should be conducted for PoE technology to be used easily in a worksite power-supply network. In other words, an improvement is required for the powered devices of an Ethernet network.

Therefore, the main object of the present invention is to provide a power management system for managing the power of powered devices in the Power over Ethernet, thereby eliminating the drawbacks encountered in the prior art technology.

SUMMARY OF THE INVENTION

The object of the present invention is to provide a power management system, which is generally implemented in the automatic power-supply network for supplying electrical power to the worksite.

The power management system of the present invention is coupled to a worksite power-supply network and a PoE (Power over Ethernet) network, and includes a power receiving terminal, a voltage converter and a power output terminal.

The power receiving terminal receives an input operating voltage with 24 volt DC from the worksite power-supply network. The voltage converter converts the input operating voltage into an output operating voltage. The output terminal conveys the output operating voltage to a powered device coupled to the PoE.

A voltage converter is implemented in the power management system of the present invention for converting the input operating voltage into the output operating voltage so that the power management system can be easily and generally used in the worksite power-supply network. Therefore, the worksite power-supply network can supply electrical power to the powered devices in the Ethernet network via the power management system of the present invention.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

Figure 1:
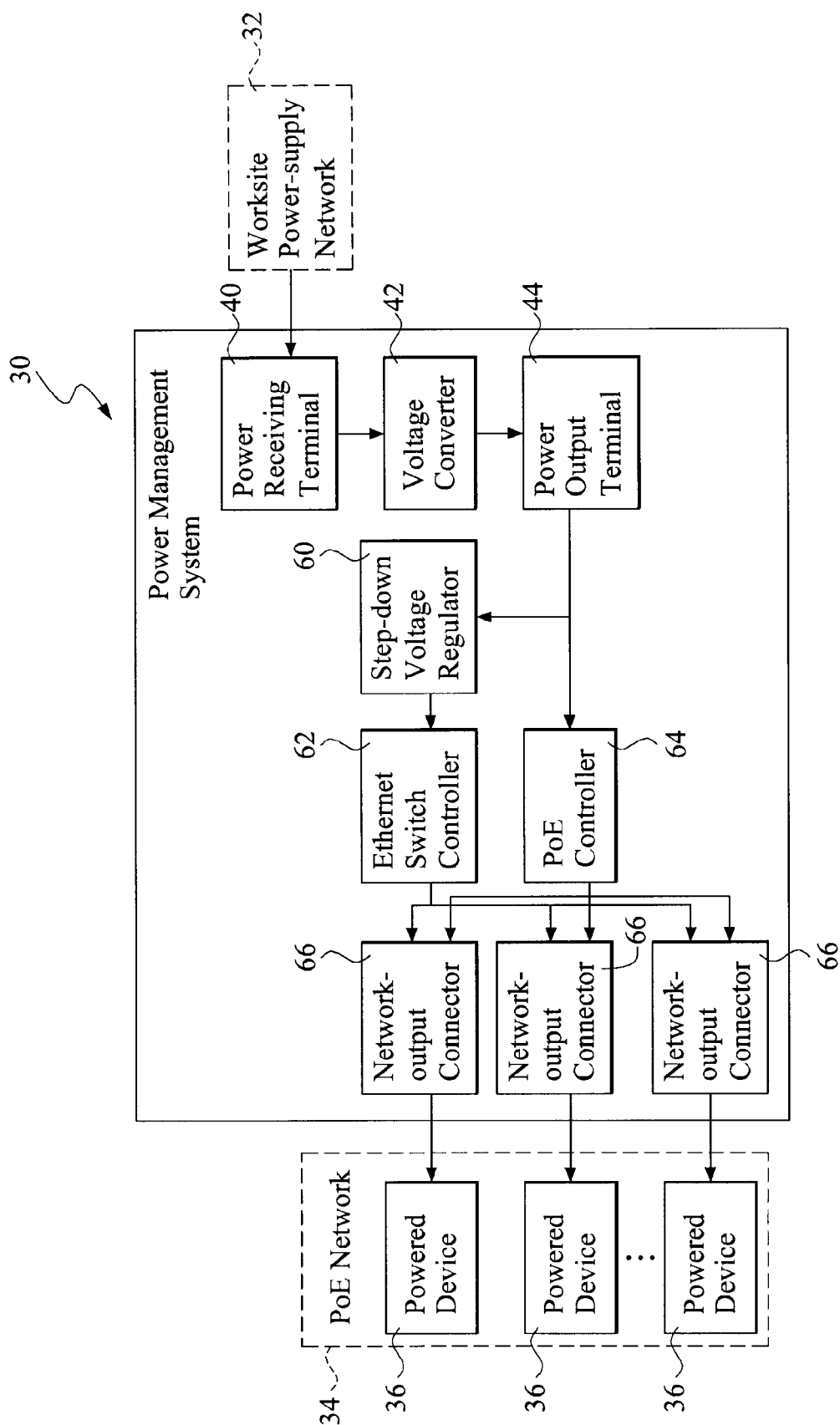
FIG. 1 is a block diagram illustrating a power management system of the present invention.

FIG. 1 is a block diagram illustrating a power management system 30 of the present invention. The present power management system 30 is coupled to a worksite power-supply network 32 and a PoE (Power over Ethernet) network 34. The power management system 30 accordingly includes a power receiving terminal 40, a voltage converter 42 and a power output terminal 44.

The worksites may include factories, business establishments, transportation companies, academic centers, traffic control systems, safety monitoring devices or surveillance equipments and many other businesses.

The power receiving terminal 40 receives an input operating voltage with 24 volt DC from by the worksite power-supply network 32. The voltage converter 42 converts the input operating voltage into an output operating voltage. The output terminal 44 transfers the output operating voltage to a powered device 36 coupled to the PoE network 34. In practical, the output terminal 44 is further capable of protecting the circuit paths, such as shutting off the circuit paths in case of a short circuit. The powered devices 36 may include IP telephones, wireless LAN access points, network cameras, routers, embedded computers and other network devices.

In actual practice, the output terminal 44 further includes a step-down voltage regulator 60, an Ethernet switch controller 62, a PoE controller 64 and a network-output connector 66.

The step-down voltage regulator 60 can lower the output operating voltage from the output terminal 44 into an operating voltage for executing data. The data operating voltage generally has low voltage, such as 1.5 to 3.3 volts, and is supplied to a common chip for data transmission. The Ethernet switch controller 62 is coupled to the step-down voltage regulator 60 for receiving and controlling the data operating voltage, thereby generating a data signal.

The PoE controller 64 is coupled to the output terminal 44 for receiving output operating voltage for inputting into the powered device 36 coupled to the PoE network 34. The PoE controller 64 can further be coupled to a plurality of the network output connectors 66.

Each network output connector 66 is coupled to the Ethernet switch controller 62 and to the PoE controller 64. In general, the network output connector 66 is coupled to the powered device 36 in the PoE network 34 via an external plug, such as RJ-45 connector.

Figure 2:
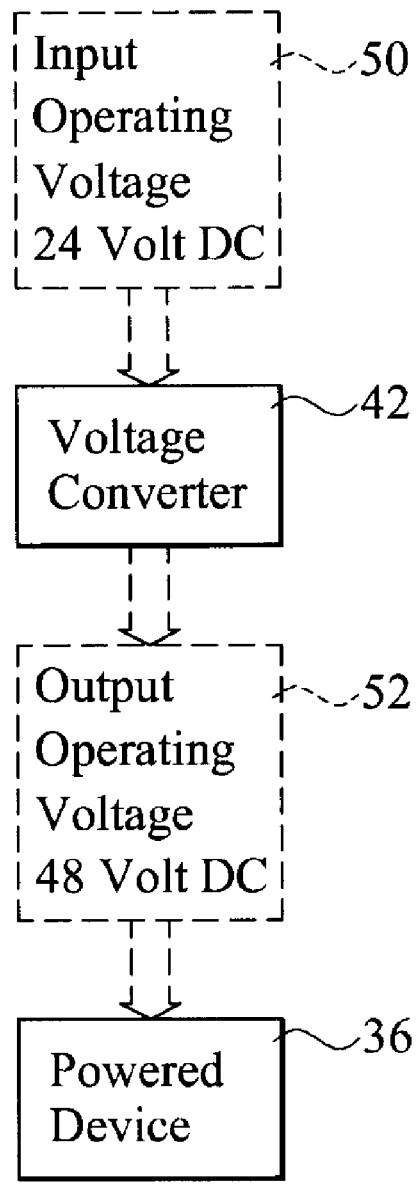
FIG. 2 is a block diagram illustrating a first embodiment of the power management system of the present invention, wherein an input operating voltage is raised into an output operating voltage of a higher level.

FIG. 2 is a block diagram illustrating a first embodiment of the power management system of the present invention. The voltage converter 42 raises an input operating voltage 50 with 24 volt DC into an output operating voltage 52 with 48-57 volt DC. In other words, 48 volt DC is the input operating voltage. Thus, when the power management system 30 is implemented, the 24 volt DC widely used in the worksite can be directly supplied to the powered devices 34 in the Power over Ethernet network 34.

Figure 3:
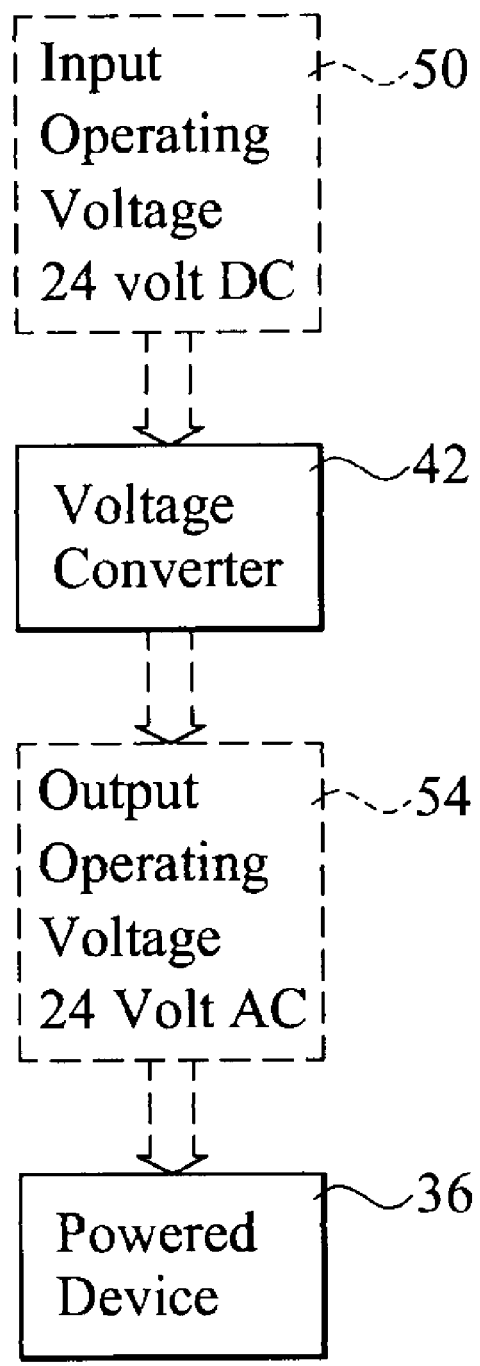
FIG. 3 a block diagram illustrating a second embodiment of the power management system of the present invention, wherein an input operating voltage is converted into an output operating voltage.

FIG. 3 is a block diagram illustrating a second embodiment of the power management system of the present invention. In addition, the voltage converter 42 can further convert the input operating voltage 50 with the 24 volt DC into the output operating voltage 54 with a 24 volt AC. Under this condition, when the power management system 30 of the present invention is implemented, the 24-volt DC of the worksite power-supply network 32 can be directly supplied to some specific powered devices 34 in the Power over Ethernet network 34 if required. Therefore, the electrical power for powering the powered devices 36 in the PoE network is easily supplied by the worksite power-supply network 32.

Therefore, with the power management system 30 of the present invention, the voltage converter 42 can convert the input operating voltage 50 into the output operating voltage 52, 54. So that the worksite power-supply network 32 can supply easily electrical power to the worksite and further powering the powered devices 36 in the PoE network 34.

While the invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A power source management system for coupling to a worksite power-supply network and a Power over Ethernet network, comprising:

a power receiving terminal for receiving an input operating voltage of 24 volts DC from the worksite power-supply network;

a voltage converter coupled to the power receiving terminal for converting the input 24 volt DC operating voltage into an output operating voltage, the output operating voltage being a selected one of an AC voltage or a DC voltage;

a power output terminal coupled to the voltage converter for protecting transmission of the output operating voltage to an output thereof, the power output terminal shutting off the output of the output operating voltage responsive to a fault condition;

a step-down voltage regulator coupled to the output of the power output terminal for lowering the output operating voltage from the output terminal into an operating voltage for executing data;

an Ethernet switch controller coupled to the step-down voltage regulator for receiving and controlling the data operating voltage, thereby generating a data signal;

a Power over Ethernet controller coupled to the output of the output terminal for input of the output operating voltage thereto; and at least one network-output connector coupled to the Ethernet switch controller and the Power over Ethernet controller and respectively receiving the data signal and the output operating voltage therefrom for transmission to a corresponding powered device coupled to the Power over Ethernet network.

2. The power source management system according to claim 1, wherein the voltage converter converts the input operating voltage into the output operating voltage having a range of 48-57 volts DC.

3. The power source management system according to claim 1, wherein the voltage converter converts the input operating voltage into the output operating voltage of 24 volts AC.

4. The power source management system according to claim 1, wherein the worksite power-supply network is used for supplying electrical power to a worksite including a factory, a business establishment, a transportation company, an academic center, a traffic control system, a safety monitoring system or a surveillance equipment.

* * * * *